Oct. 29, 1968  R. D. LOCKWOOD  3,407,917
ORIENTING DEVICE
Filed April 20, 1967  4 Sheets-Sheet 3
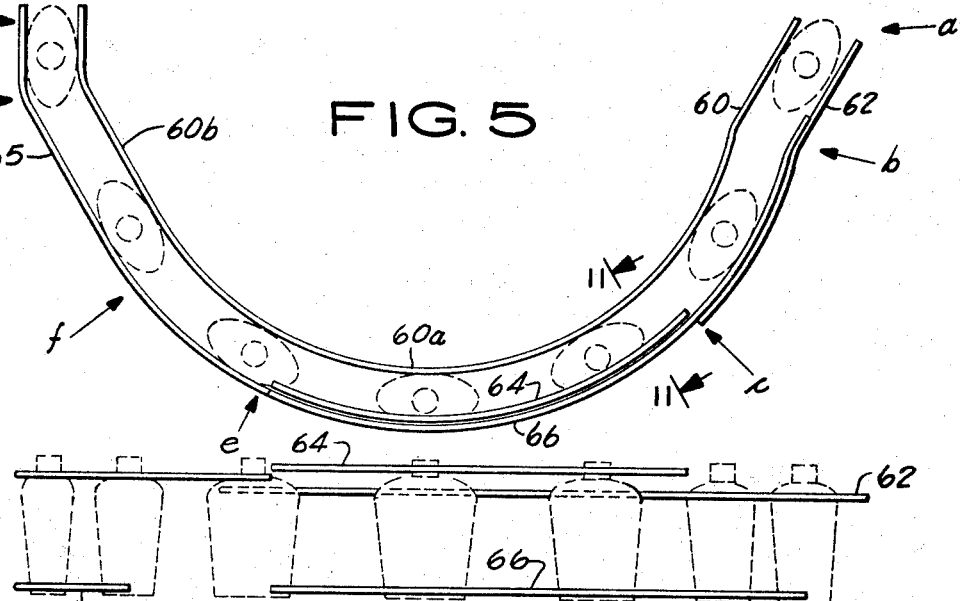
FIG. 5
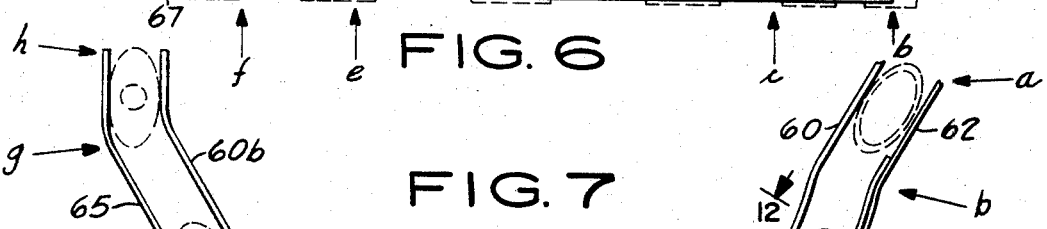
FIG. 6
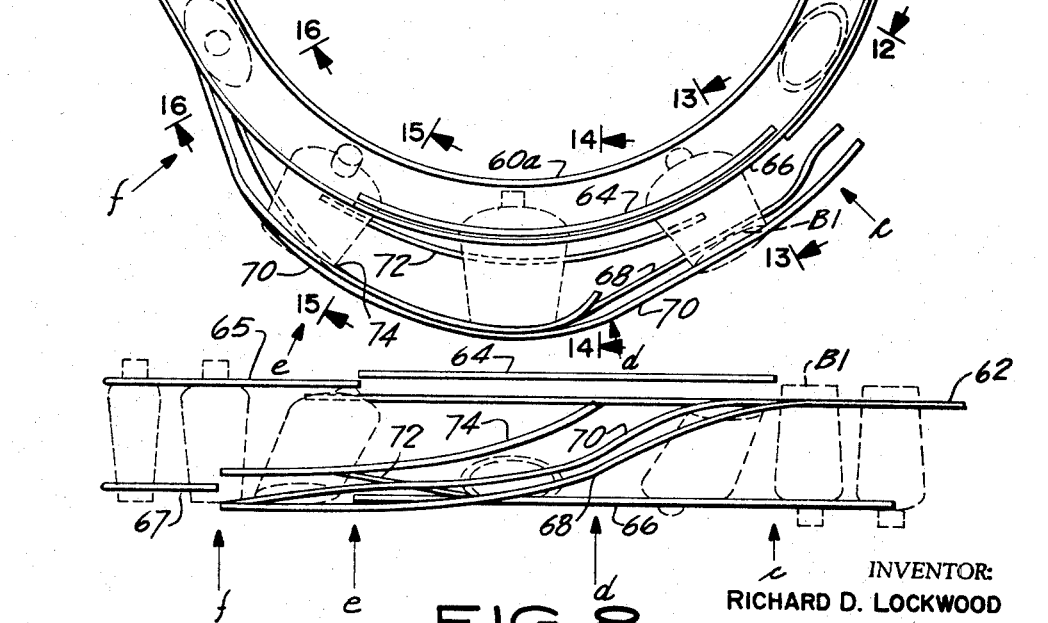
FIG. 7
FIG. 8
INVENTOR:
RICHARD D. LOCKWOOD
BY Robert Henderson
ATTORNEY

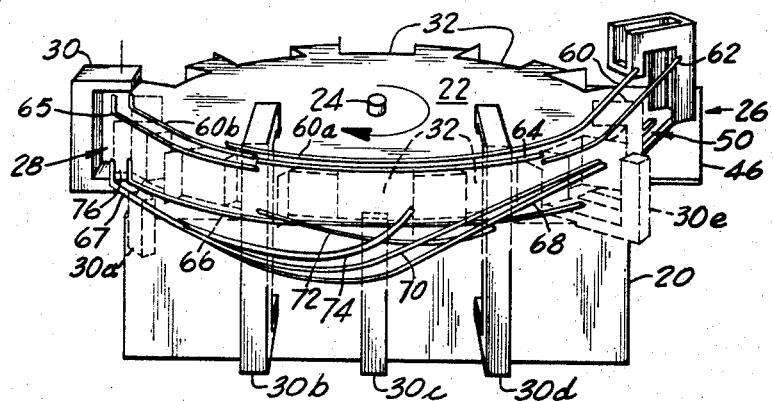

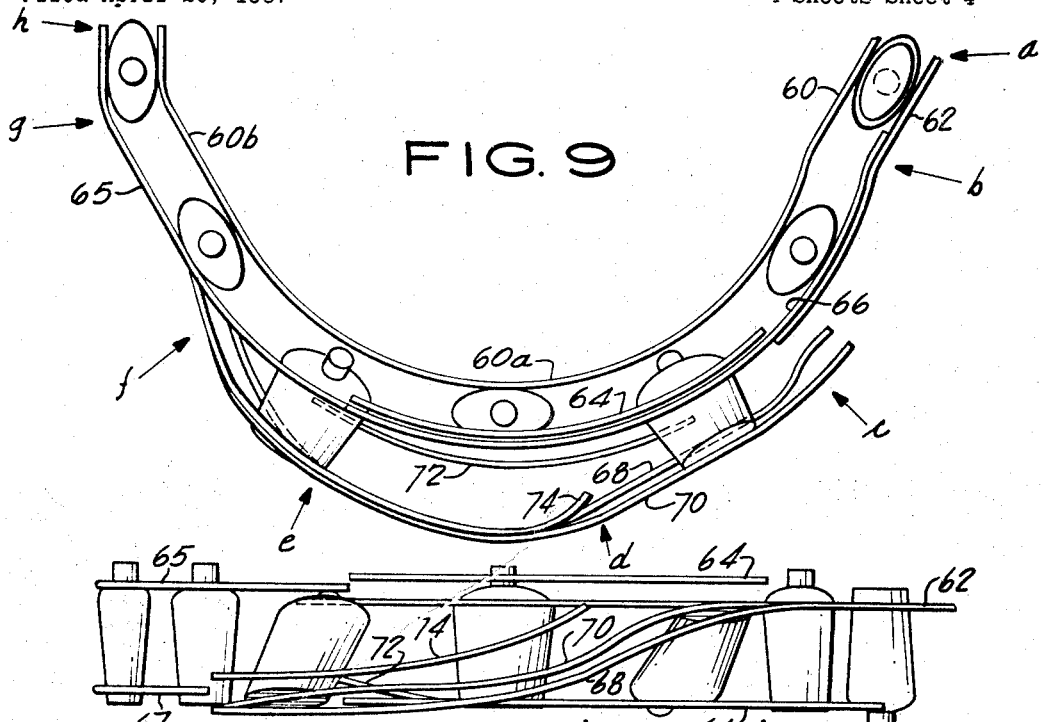

United States Patent Office 3,407,917
Patented Oct. 29, 1968

3,407,917
ORIENTING DEVICE
Richard D. Lockwood, 271 Hillside Ave.,
Livingston, N.J. 07039
Filed Apr. 20, 1967, Ser. No. 632,307
10 Claims. (Cl. 198—33)

ABSTRACT OF THE DISCLOSURE

A driven rotary table is provided with peripheral pockets which receive bottles and move them, from a receiving station to a discharging station, sliding along suitably shaped rails which turn inverted bottles to upright position while leaving upright bottles in upright position.

Background of the invention

It has been common practice, where articles to be processed are not in proper orientation, for those articles which are not properly oriented to be dropped out of a series of such articles and refed to a hopper for rehandling by the orienting device; the arrangement being such that only properly oriented articles pass the dropout station. Applicant is not aware of any practical device which avoids the need for such a dropout station.

Summary of the invention

The present invention resides in a device employed with conveying means which carry bottles or the like from a bottle supply station to another station where filling or other processing of the bottles is to take place.

In its broader aspects, this invention includes a bottle pusher disclosed herein as a driven rotary table having a series of peripheral bottle carrying pockets, a bottle receiving station at which bottles are fed successivley into said pockets rather indiscriminately as to orientation as between upright and inverted positions, a bottle discharging station at which bottles, all in upright positions, are discharged from the rotary table onto a suitable conveyor for carrying the bottles to other means where the bottles may be filled or otherwise processed, and an assembly of fixed bottle orienting rails disposed about the table between the two mentioned stations. Some of these rails are common in function both for holding upright bottles in upright position and for turning inverted bottles to upright position. Other rails, separately provided for two different functions, are designed (1) for cooperation with the common rails in holding upright bottles in upright position or, (2) for cooperating with the common rails in turning inverted bottles to upright position.

Brief description of the drawing

The accompanying drawing illustrates rather diagrammatically a preferred embodiment of orienting device according to this invention in which drawings:

FIG. 1 is a perspective view of the device; certain portions being in broken lines to avoid confusion with a full line showing of bottle orienting rails.

FIG. 2 is a plan view of the device, with certain portions in broken lines to avoid confusion with a full line showing of bottle orienting rails.

FIG. 5 is a plan view of only certain rails which operate to hold a moving upright bottle in upright position; the bottle being shown in broken lines at various positions of its travel.

FIG. 6 is a side elevational view of the rails and bottle shown in FIG. 5.

FIG. 7 is a plan view of only certain rails which operate to turn a moving initially inverted bottle to upright position; various positions of that bottle, in travel, being shown in broken lines.

FIG. 8 is a side, elevational view of the rails and bottle positions shown in FIG. 7.

FIG. 9 is a plan view showing a series of bottles in which some bottles are upright and others inverted and showing rails functioning to hold the upright bottles in upright position and to turn initially inverted bottles to upright position.

FIG. 10 is a side elevational view of the bottles and rails shown in FIG. 9.

FIG. 11 is a detail view, as seen from line 11—11 of FIG. 5, of a bottle and related rails holding that bottle in upright position.

FIGS. 12–16 are detail views of a bottle in initially inverted position and in several successive positions in the course of turning of the bottle from inverted position to upright position; these figures including related rails and, respectively, being as viewed from the lines 12—12, 13—13, 14—14, 15—15, and 16—16 of FIG. 7.

Description of the preferred embodiment

Figure 3:
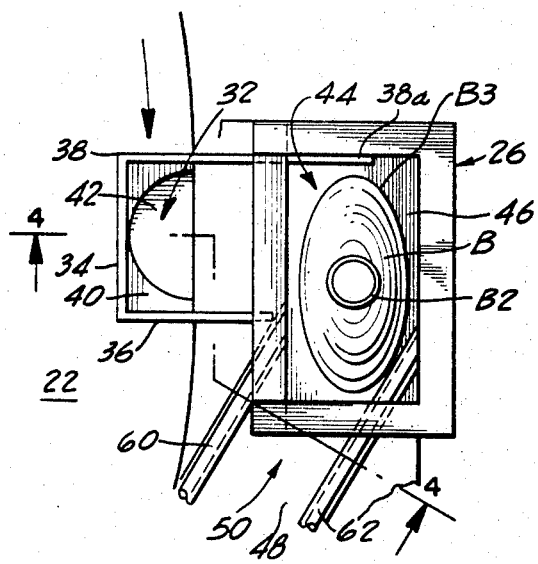
FIG. 3 is an enlarged plan view of the bottle receiving station which appears at the right side of FIG. 2.
Figure 4:
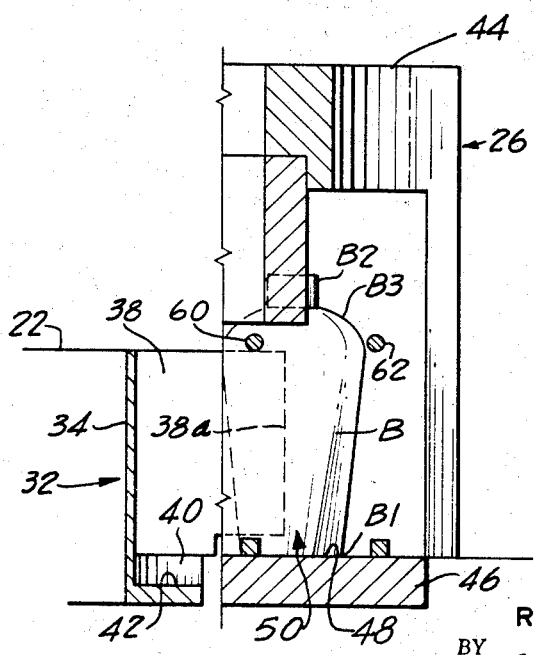
FIG. 4 is a vertical, sectional view substantially on the line 4—4 of FIG. 3.

Referring to FIGS. 1–4, the illustrated bottle orienting device comprises a stationary base 20, a circular rotary table 22, supported above the base and fixed upon a vertical shaft 24 which is suitably driven by means (not shown) to cause the table to turn continuously in the direction of the arrow appearing thereon in FIGS. 1–3.

The device also includes a bottle receiving station generally indicated at 26 and a bottle discharging station generally indicated at 28. These two stations are shown in the drawing as being almost directly opposite each other so that bottle handling by the device takes place within approximately only 180 degrees of rotation of the table. It will be understood of course that the two mentioned stations can be operatively spaced to a much greater extent to make the bottle handling operation of the device effective over 270 degrees, or even more, of the periphery of the table.

FIGS. 1 and 2 also show relatively rigid brackets 30a, b, c, d, and e, which serve as means for mounting guide rails as hereinafter explained.

The table 22 is provided with a peripheral series of similar equidistant, open pockets 32. Each pocket is defined by a back wall 34, a leading wall 36 and a trailing wall 38, the latter being considerably greater in radial dimension than the leading wall. Each pocket 32 also is provided with a floor portion 40 which is cut away to provide a semi-circular recess 42 for receiving the neck portion of a bottle which may have been fed to the device in initially inverted position.

The bottle receiving station 26 includes a vertical chute 44 into which bottles being fed to the device are dropped from a hopper (not shown) or other suitable source of bottle supply. The chute 44 is provided with a bottle receiving floor 46 disposed at about the same level as the floor portions 40 of the table's pockets. It will be observed that the chute 44 is disposed radially outwardly of all parts of the table 22 excepting outer portions 38a of the trailing walls 38 of the several pockets 32.

A floor 48 of a guide channel 50 is provided as a continuation of the chute's floor 46, and said channel extends tangentially of the table to merge with the circular path of movement of the pockets 32 at the level of the pockets' floor portions 40.

Each bottle B received at the receiving station 26 is engaged by the outer portion 38a of a trailing wall 38 and pushed to slide the bottle from floor 46, along the guide channel 50, onto a floor portion 40 in a pocket 32. A bottle in upright position would rest with its bottom surface B1 upon the pocket's floor portion 40 while, if the bottle were in an initially inverted position, that bottle, upon entering the pocket, would be in such relation to the latter that its neck portion B2 would drop into the recess 42 with shoulders B3 of the inverted bottle resting upon the floor portion 40. Thus, as bottles are received in the pockets, the uprightly fed bottles have an effective height, above the floor portions 40, which is greater than the effective height of an invertedly fed bottle approximately to the extent of the length of a bottle's neck B2.

The assembly of orienting rails

The orienting rails are rigidly mounted on the base 29 and are shown as of rod material although material of angular shape in cross section may advantageously be used for at least some of the rails. Bottles in the circularly moving pockets 32 slide along in engagement with certain rails to achieve orientation. It is believed that details of the rail assembly may best be understood by the following description of the disposition of the rails and the orienting operation thereof.

Maintaining an upright bottle in upright position

The various rails are either suspended from or supported by suitable rods or equivalent means (not shown) connected to the brackets 30a, b, c, d, e, for holding the rails in their operative positions. Such rods may advantageously be adjustable in length, and rails or rail parts to which they are connected may be shiftable by adjustment of said rods to adapt the device for use with different sizes and shapes of bottles. Such rods are not illustrated, as to show them would unduly complicate the drawing without adding to the understanding of the invention. Also, where convenience dictates, different rails may be interconnected; and some rails may be in separately adjustable parts, all contributing to the rail's intended function.

In the following description, points corresponding to the effective beginnings and ends of the various rails are designated by letters a, b, c, d, etc.; these letters being applied to FIGS. 2 and 5–10.

Assuming that the table 22, is turning continuously, a bottle delivered through chute 44 in upright position at point a is received upon the bottle receiving floor 46 whereafter an outer portion 38a of a pocket wall 38 engages the bottle and slides it along channel 50 to cause the bottle to move into a related pocket 32. During movement along said channel, the bottle is held against tipping by back and front upper rails 60, 62 which, respectively, engage in back of and in front of the bottle just below the latter's shoulders B–3; these two rails extending, as a pair, directly over the channel 50 and in the same tangential direction as the latter.

From the point b where the bottle becomes fully seated in its related pocket 32, a mid-portion 60a of the back rail 60 continues arcuately about the table, with the shaft 24 as a center, to point f where an end portion 60b of the rail 60 continues tangentially outwardly to point g at the discharging station 28. Thus, the rail 60, with its mentioned portions, is effective at all points along the path traversed by the bottles, to limit radially inward wobbling of the bottles.

The front rail 62 continues tangentially at its described height to point b, and thence arcuately to its termination at point c where, as hereinafter explained, certain rails of the assembly may function to upend bottles delivered by the cute 44 in an initially inverted position. At point c, the front rail 62, which prevents bottles from overturning as a result of centrifugal force, is succeeded by a somewhat higher, neck engaging rail 64, this rail extending arcuately to point e to engage the outer surfaces of an upright bottle's neck B2, to continue holding the bottle against overturning as a result of centrifugal force.

At point e, rail 64 is succeeded by another upper rail 65 which, however is somewhat lower than rail 64; rail 65 extending arcuately to point f and thence tangentially to point g. Below and in vertical alignment with the area between the tangential portions of the rails 60b and 65 is a suitable tangential ramp 76 functioning somewhat similarly to channel 50, for guiding and carrying oriented bottles tangentially from their related pockets 32 to the discharging station 28 where they are pushed onto a suitable conveyor (not shown) for transferring the bottles to another processing station.

While the upright bottles are to be retained in their pockets 32, the lower portions of the bottles are restrained against material radially outward movement by a lower front rail 66 which extends arcuately of the table, from point b near receiving station 26 to point e. Positioned approximately as a discontinuous extension of rail 66 is a rail 67 which extends tangentially from point f to points g and h to restrain lower portions of bottles against the effect of centrifugal force.

Turning an initially inverted bottle to upright position

If a bottle is received upon floor 46 of chute 44 in an inverted rather than an upright position, that bottle will be pushed by wall portion 38a along the guide channel 50 while remaining in said inverted position. However, upon entering its related pocket 32, at point b, the neck B2 of the bottle will drop into the recess 42 of said pocket so that the effective height of the bottle above the pocket's floor 40 will correspond only to the height of the body portion of the bottle.

When the inverted bottle reaches point c in its path of movement where rail 62 terminates and rail 64 begins, the latter rail is higher than any portion of the inverted bottle so that from that point, through further arcuate movement of the bottle, the bottom B1 of the bottle, then in uppermost position, falls or arcs radially outwardly and downwardly as a result of centrifugal force to commence an overturning movement of the bottle. This overturning movement is partially controlled by a tilt controlling rail 68 which engages an under outer surface of the bottle near the bottom B1 thereof whereby to lower the bottom of the bottle while the upper part of the bottle is held up by the lower front rail 66 which at that stage of operation acts as a fulcrum for the bottle.

The rail 68 as best seen in FIGS. 1, 2, and 7–10, slopes downwardly as viewed in side elevation and extends outwardly as viewed from above; this sloping and extension continuing to just beyond point d at which the bottle B is in approximately horizontal position as shown in FIGS. 8 and 14. As the rail 68 would not hold the bottle against being thrown outwardly by centrifugal force at least while the bottle is approximately horizontal, a confining rail 70 is disposed in a position more or less parallel to rail 68, outwardly of and somewhat higher than the latter so that when the bottle is in the position shown in FIG. 14, the rail 70 holds the bottle against the possibility of being dislodged by centrifugal force.

As the bottle moves from its position of FIG. 14 to its position of FIG. 15, the tilt controlling rail 68 engages the then underside of the bottle, near the bottom thereof, while confining rail 70 engages the bottom of the bottle. As these two rails extend to their lowermost positions, they curve inwardly to push the bottom of the bottle inwardly toward its related pocket while the upper end of the bottle slides upwardly in the pocket, being aided in this sliding by an upwardly extending rail 72 which is positioned to engage the then underside of the bottle near its shoulder B3. As this described overturning of the bottle takes place, the bottle is engaged by an upper confining rail 74 which holds the bottle in its proper operative relationship to the rails 68 and 70.

The tail end portions of the rails 68, 70, and 74 all converge back toward the arcuate path of movement of the pockets 32 in the area of point *e* and to point *f*, thereby pushing the lower part of the bottle inwardly to complete the overturning of the bottle and its restoration to its related pocket approximately at point *f*. In this inward pushing, the lower part of the bottle moves through a breach between point *e* where rail 66 ends and point *f* where rail 67 begins.

Thus, after the initially inverted bottles are turned to their upright positions and restored to their related pockets, all the bottles in all the pockets are upright, ready to be pushed successively, tangentially out of their pockets along the ramp 76 and on to a suitable conveyor at the discharging station 28 to be carried from the subject apparatus to other apparatus for filling or other processing of the bottles. Rails 60*b*, 65, and 67 serve to hold the bottles upright as they are being discharged over the ramp 76; and, for the same purpose, the ramp itself may be suitably channeled to receive and guide the bottoms of the bottles.

Orienting of a series of bottles

FIGS. 9 and 10 show a series of bottles spaced as they would be by being held in relation to their respective pockets in rotary table 22. Some of said bottles are shown in initially inverted positions and others, initially inverted bottles, are shown in various positions which they occupy in being turned over while initially upright bottles remain upright. In such a series, upright bottles are held upright and inverted bottles are turned to upright positions, all by the means and in the manner hereinbefore described.

General comments

Largely because of the arrangement under which certain rails, as described, limit bottles against undesired movement which might be caused by centrifugal force, this device can handle bottles quite rapidly at a table speed of about twenty revolutions or more per minute, thus serving to orient bottles at a rate of upwards of 200 bottles per minute.

This device avoids the need for recirculating bottles which may be received in inverted positions.

This device, also, keeps the bottles suitably spaced during handling and delivers them, all properly oriented, continuously to the ramp 76.

As a result of the simplicity of this device, it can be produced and maintained in operation at a much lower cost than prior, similar purpose machines which operate less effectively than the present machine.

The various rails may be adjustably carried or supported by the supports 30*a*, *b*, *c*, *d*, and *e*, thereby enabling this device to be readjusted quickly to change over from the handling of one size and/or shape to another size and/or shape of bottle. While the rails should be disposed to operate as described, they need not necessarily be disposed precisely as illustrated in the drawing, but they may be bent or combined or sub-divided to enable the bottles to move smoothly during orientation thereof.

I claim:

1. A necked-bottle orienting device comprising a driven bottle carrier having a series of similar, coplanar, side-opening pockets for carrying bottles therein horizontally along a path of bottle orienting movement, each of said pockets having a floor for engaging a bottom of a related upright bottle and a recess formed in said floor for receiving the neck portion of a related inverted bottle, to give an inverted bottle a lesser effective height above its related pocket's floor than the effective height of an upright bottle in the latter's related pocket, and an assembly of bottle guiding rails adjacent to said path and extending generally longitudinally thereof; said assembly comprising an orienting portion including an arcing control rail positioned to engage a then undersurface of a downwardly arcing bottle adjacent the bottle's bottom to control such arcing of an initially inverted bottle, a lifting rail positioned to engage a then undersurface of a downwardly arced bottle adjacent the bottle's top and to cooperate with said arcing control rail to rotate the bottle from an inverted to an upright position, and a lateral control rail positioned to engage a bottom surface of an arcing bottle to oppose translational movement of the latter from its related pocket, the latter rail being shaped to push the bottom of the rotating bottle inwardly to restore the latter fully into its related pocket; the device also including means for holding initially upright bottles in their related pockets, in upright position.

2. A bottle orienting device according to claim 1, wherein said bottle carrier is a horizontally disposed, rotatively driven table about the periphery of which said pockets are equidistantly spaced, said lateral control rail serving to oppose the effect of centrifugal force tending to dislodge bottles from their respective pockets.

3. A necked-bottle orienting device comprising a driven bottle carrier having a series of similar, coplanar, side-opening pockets for carrying bottles therein horizontally along a path of bottle orienting movement, each of said pockets having a floor for engaging a bottom of a related upright bottle and a recess formed in said floor for receiving the neck portion of a related inverted bottle, to give an inverted bottle a lesser effective height above its related pocket's floor than the effective height of an upright bottle in the latter's related pocket, and an assembly of bottle guiding rails adjacent to said path and extending generally longitudinally thereof; said assembly comprising a pre-orienting portion which includes rails positioned to hold bottles against material movement within their related pockets irrespective of whether the bottles are properly oriented in said related pockets, an orienting portion including rails positioned to receive and guide bottles passing from said pre-orienting portion, said orienting portion including neck-engaging rail positioned at such a height as to engage neck portions of upright bottles to hold the latter upright while being clear of any inverted bottle to permit all inverted bottles to arc downwardly from said path, and including also rails positioned to engage parts of a thus arcing bottle to rotate the latter, in a moving plane extending transversely of said path, from its initial, inverted position to an upright position in which it is fully restored to its related pocket, and a post-orienting portion including rails positioned to engage the bottles received from said orienting portion and hold said bottles in upright positions.

4. An orienting device according to claim 3; said bottle carrier being a horizontally disposed, rotatively driven table about the periphery of which said pockets are equidistantly spaced; all said portions of the rail assembly including lower, restraining, rails extending arcuately about and adjacent to the table in position to engage radially outer surfaces of bottles in said pockets immediately above the level of the floors of said pockets to hold then lower portions of all bottles against radially outward shifting; said orienting portion including a pair of bottle rotating rails extending downwardly and outwardly, then upwardly and inwardly and positioned to engage then underside surfaces and bottoms of outwardly arcing bottles to control such arcing and to urge the thus engaged bottles radially inwardly, and an upwardly extending lifting rail, positioned to engage then undersurfaces of arcing bottles adjacent to their necks to cooperate with said pair of rails to rotate initially inverted bottles to upright positions; and a breach being provided in the lower restraining rails, at said orienting portion enabling rotating bottles to be pushed back into related pockets by said pair of rails.

5. An orienting device according to claim 4, each of said pockets having a radially extending leading wall and a trailing wall extending radially outwardly to a greater extent than said leading wall; and the device further including a bottle receiving station at which bottles are received outside of the path of movement of said leading wall but within the path of movement of said trailing wall, and a guide channel extending from said bottle receiving station, tangentially inwardly toward said pockets to direct bottles being pushed by said trailing wall into said pockets at said pre-orienting portion of the rail assembly.

6. An orienting device according to claim 5, further including a bottle discharging station, and a discharge ramp extending tangentially outwardly from said post-orienting portion of the rail assembly to said discharge station; said ramp being so positioned that bottles thereon are in the path of movement of said trailing walls of the pockets whereby to be pushed along the ramp to the bottle discharging station.

7. A bottle orienting device comprising an arcuate series of similar continuously driven, radially outwardly opening bottle pockets, and an assembly of stationary, bottle turning rails extending adjacent to and along the line of movement of said pockets; said assembly comprising a lower, fulcrum rail positioned to engage an outer, outside surface of an initially inverted bottle near the latter's then lowermost portion to serve as a fulcrum for outward arcing of an initially inverted bottle, an arcing control rail sloping downwardly and positioned to engage an outer, outside surface of said bottle near the latter's then uppermost portion to support and lower the latter portion in an initial overturning movement of the bottle, an inwardly extending rail positioned to engage a bottom portion of the bottle and to urge the bottle toward its related pocket, and an upwardly extending lifting rail positioned to engage a then lower, outside surface of a partially overturned bottle adjacent a top portion of the bottle to cooperate with said inwardly extending rail in completing rotation of an initially inverted bottle to its upright position.

8. An oriening device according to claim 7, said arcing control rail curving outwardly to maintain support of the bottle adjacent its bottom during outward arcing of the bottle.

9. An orienting device according to claim 7, said fulcrum rail terminating to provide a breach through which the bottom portion of a turning bottle may pass to enter the bottle's related pocket.

10. An orienting device according to claim 7, further including a downwardly sloping, confining rail positioned to engage a then upper surface of an arcing bottle to positively urge a bottom portion of the bottle downwardly toward said arcing control rail.

References Cited
UNITED STATES PATENTS

| | | |
|---|---|---|
| 681,300 | 8/1901 | Butler. |
| 953,056 | 3/1910 | Page. |
| 2,440,959 | 5/1948 | Krueger _____ 193—43 |
| 2,857,039 | 10/1958 | Whitecar _____ 198—33 |
| 3,095,957 | 7/1963 | Roberts et al. _____ 193—43 |

EVON C. BLUNK, *Primary Examiner.*

M. L. AJEMAN, *Assistant Examiner.*